(12) United States Patent
Tominaga

(10) Patent No.: US 8,031,118 B2
(45) Date of Patent: Oct. 4, 2011

(54) PHASE CORRECTION APPARATUS, DVOR APPARATUS, AND PHASE CORRECTION METHOD

(75) Inventor: Yasushi Tominaga, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1082 days.

(21) Appl. No.: 11/761,720

(22) Filed: Jun. 12, 2007

(65) Prior Publication Data

US 2011/0037653 A1    Feb. 17, 2011

(30) Foreign Application Priority Data

Jun. 13, 2006  (JP) .............................. P2006-163355

(51) Int. Cl.
G01S 1/44    (2006.01)

(52) U.S. Cl. ........................................ 342/405; 342/406

(58) Field of Classification Search .................. 342/405, 342/406
See application file for complete search history.

(56) References Cited

U.S. PATENT DOCUMENTS

| | | | |
|---|---|---|---|
| 3,181,159 A * | 4/1965 | Kramar et al. | 342/406 |
| 4,005,427 A | 1/1977 | Hofgen | |
| 4,197,542 A | 4/1980 | Hofgen | |
| 4,382,259 A * | 5/1983 | Becavin et al. | 342/406 |
| 4,484,196 A | 11/1984 | Lucas et al. | |
| 4,591,861 A * | 5/1986 | Kautz | 342/404 |
| 4,931,803 A * | 6/1990 | Shimko | 342/371 |
| 5,008,680 A * | 4/1991 | Willey et al. | 342/372 |
| 5,045,859 A | 9/1991 | Yetter | |
| 5,623,270 A * | 4/1997 | Kempkes et al. | 342/372 |
| 2006/0038599 A1 * | 2/2006 | Avants et al. | 327/276 |
| 2007/0247363 A1 * | 10/2007 | Piesinger | 342/368 |

FOREIGN PATENT DOCUMENTS

| | | |
|---|---|---|
| GB | 2 081 548 A | 2/1982 |
| JP | 57-59179 | 4/1982 |
| JP | 57-118169 | 7/1982 |
| JP | 63-39876 | 8/1988 |
| JP | 1-142478 | 6/1989 |
| JP | 3-267803 | 11/1991 |
| JP | 8-43513 | 2/1996 |
| JP | 2001-249172 | 9/2001 |
| JP | 2005-91285 | 4/2005 |
| JP | 2005-210364 | 8/2005 |

OTHER PUBLICATIONS

U.S. Appl. No. 11/943,129, filed Nov. 20, 2007, Tominaga.
Japanese Office Action issued Nov. 2, 2010, in Patent Application No. 2007-156342 (with English-language translation).

* cited by examiner

*Primary Examiner* — Gregory C Issing
(74) *Attorney, Agent, or Firm* — Oblon, Spivak, McClelland, Maier & Neustadt, L.L.P.

(57) ABSTRACT

A phase correction apparatus comprising a storing means configured to store a phase correction value associated with each of a plurality of transmission antennas in which the phase correction value is calculated according to an electrical length of a signal path extending from a signal generator generating a transmission signal to the transmission antenna, and correction means configured to correct a phase of the transmission signal to be supplied from the signal generator to each transmission antenna according to the phase correction value for the transmission antenna stored in the storing means.

11 Claims, 8 Drawing Sheets

PHASE CORRECTION APPARATUS, DVOR APPARATUS, AND PHASE CORRECTION METHOD

BACKGROUND OF THE INVENTION

1. Field of the Invention

The present invention relates to a phase correction apparatus, a DVOR (Doppler VHF omnidirectional radio range) apparatus, and a phase correction method for radio navigation.

2. Description of the Related Art

An example of a DVOR apparatus for providing aircraft with directional information is disclosed in U.S. Pat. No. 4,484,196. The DVOR apparatus of the related art arranges, as shown in FIG. 5, a central carrier antenna A and forty-eight sideband antennas B1 to B48 along a circle having a diameter of about 13.5 m (a radius R of about 6.7 m in FIG. 5) around the carrier antenna A.

The carrier antenna A radiates a reference phase signal in all directions. The reference phase signal is an AM wave formed by amplitude-modulating at 30 Hz a carrier of 108 to 118 MHz. The sideband antennas B1 to B48 arranged along the circle are sequentially activated at regular intervals of, for example, 30 times a second, so that the sideband antennas B1 to B48 successively emit subcarriers whose frequency is higher than that of the carrier by, for example, 9960 Hz. A distance between the sideband antenna emitting a subcarrier and an optional spatial point periodically changes with time, and therefore, the subcarriers received at the optional spatial point periodically change the frequency thereof due to Doppler effect, to form an FM wave of 30 Hz. The phase of this FM wave is dependent on an orientation with respect to a DVOR station where the DVOR apparatus is present. Namely, the sideband antennas B1 to B48 radiate the FM wave superposed by a variable phase signal.

The reference phase signal and variable phase signal are adjusted so that their phases agree with each other on magnetic north, i.e., at zero degrees. An aircraft receives these two signals, detects a phase difference between the AM wave and the FM wave both modulated at the same frequency of 30 Hz, and finds a present orientation of the aircraft.

FIG. 1 shows a sideband transmission system of the DVOR apparatus according to the related art. In FIG. 1, a sideband transmitter 101 generates a half-sine wave signal, supplies the signal to a distributor 3, and controls the switching of the distributor 3 so that the half-sine wave signal is successively supplied to odd-numbered sideband antennas B1, B3, . . . , and B47. A sideband transmitter 102 generates a half-cosine wave signal, supplies the signal to the distributor 3, and controls the switching of the distributor 3 so that the half-cosine wave signal is successively supplied to even-numbered sideband antennas B2, B4, . . . , and B48. The sideband antennas B1 to B48 are connected through antenna cables C1 to C48, respectively, to the distributor 3.

FIG. 2 is a timing chart showing the timing of switching the sideband antennas. As indicated with waveforms (a) to (e) in FIG. 2, each of the 48 sideband antennas receives a signal for 1/720 seconds, i.e., the signals are supplied 30 times a second.

Waveforms (e.g. (a), (c), (e)) provided by the odd-numbered sideband antennas must be continuous between two adjacent ones. Also, waveforms (e.g. (b), (d)) provided by the even-numbered sideband antennas must be continuous between two adjacent ones. If waveforms are discontinuous between adjacent odd- or even-numbered antennas, an aircraft is unable to correctly detect a phase difference between the AM wave from the carrier antenna A and the FM wave from the sideband antennas B1 to B48, and therefore, is unable to find a correct orientation.

To avoid the problem, the DVOR apparatus according to the related art precisely equalizes the lengths of the antenna cables C1 to C48 with one another, to align the phases of radio waves provided by the sideband antennas B1 to B48.

However, to align the phases of radio waves provided by the sideband antennas, the 48 antenna cables C1 to C48 of the DVOR apparatus must precisely be processed into identical electrical lengths. This process needs a long time and skill. Even with the identical electrical lengths, the related art is still vulnerable to phase shifts that may occur due to the aging of the antenna cables after installing the DVOR apparatus at a site.

SUMMARY OF THE INVENTION

According to a first aspect of the present invention, a phase correction apparatus includes storing means and correction means. The storing means stores a phase correction value associated with each a of plurality of transmission antennas. The phase correction value is calculated according to an electrical length of a signal path extending from a signal generator generating a transmission signal to the transmission antenna. The correction means corrects a phase of the transmission signal supplied from the signal generator to each transmission antenna according to the phase correction value for the transmission antenna stored in the storing means.

According to a second aspect of the present invention, provided is a DVOR apparatus having a carrier antenna radiating a carrier signal and a plurality of sideband antennas arranged along a circle around the carrier antenna and sequentially emitting a sideband signal. The DVOR apparatus includes a signal generator, storing means, correction means, switching means, and control means. The signal generator generates a sideband signal. The storing means stores a phase correction value associated with each of the sideband antennas. The phase correction value is calculated according to an electrical length of a signal path extending from the signal generator to the side band antenna. The correction means corrects a phase of the sideband signal supplied from the signal generator to each sideband antenna according to the phase correction value for the sideband antenna stored in the storing means. The switching means switches the sideband antennas from one to another so that the phase-corrected sideband signal is supplied to the sideband antenna. The control means controls the phase correction means, so that the correction means corrects the phase of the sideband signal in synchronization with the switching of the switching means.

DESCRIPTION OF THE PREFERRED EMBODIMENT

Embodiments of the present invention will be explained with reference to the accompanying drawings.

First Embodiment

Figure 1:
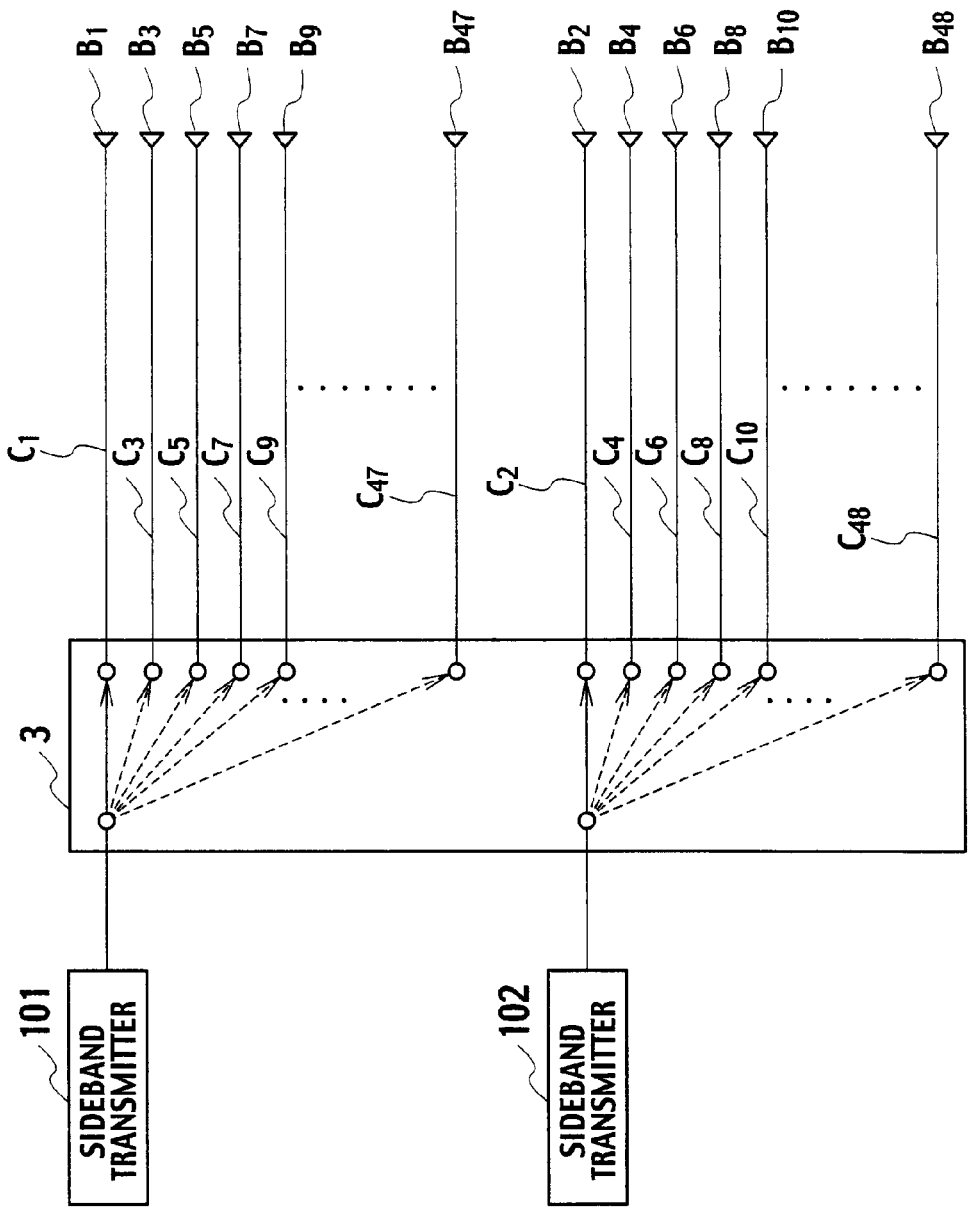
FIG. 1 is a view showing a sideband transmission system of a DVOR apparatus according to a related art.
Figure 2:
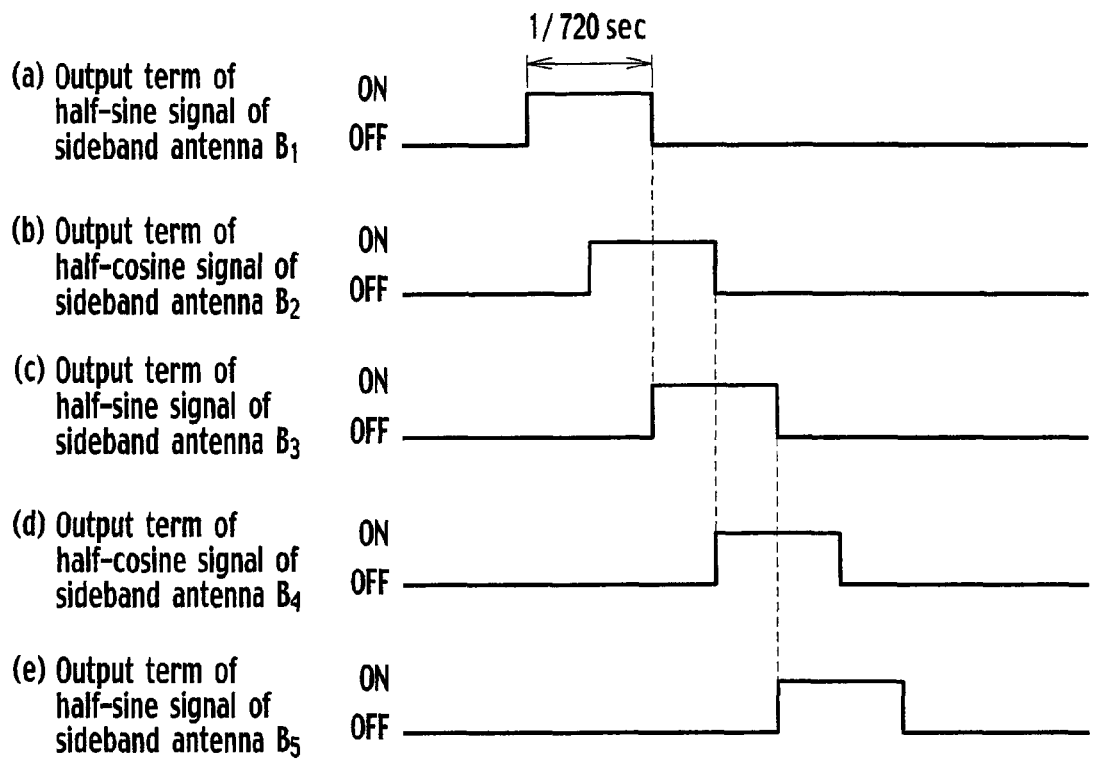
FIG. 2 is a timing chart showing the timing of switching sideband antennas from one to another according to the related art.
Figure 3:
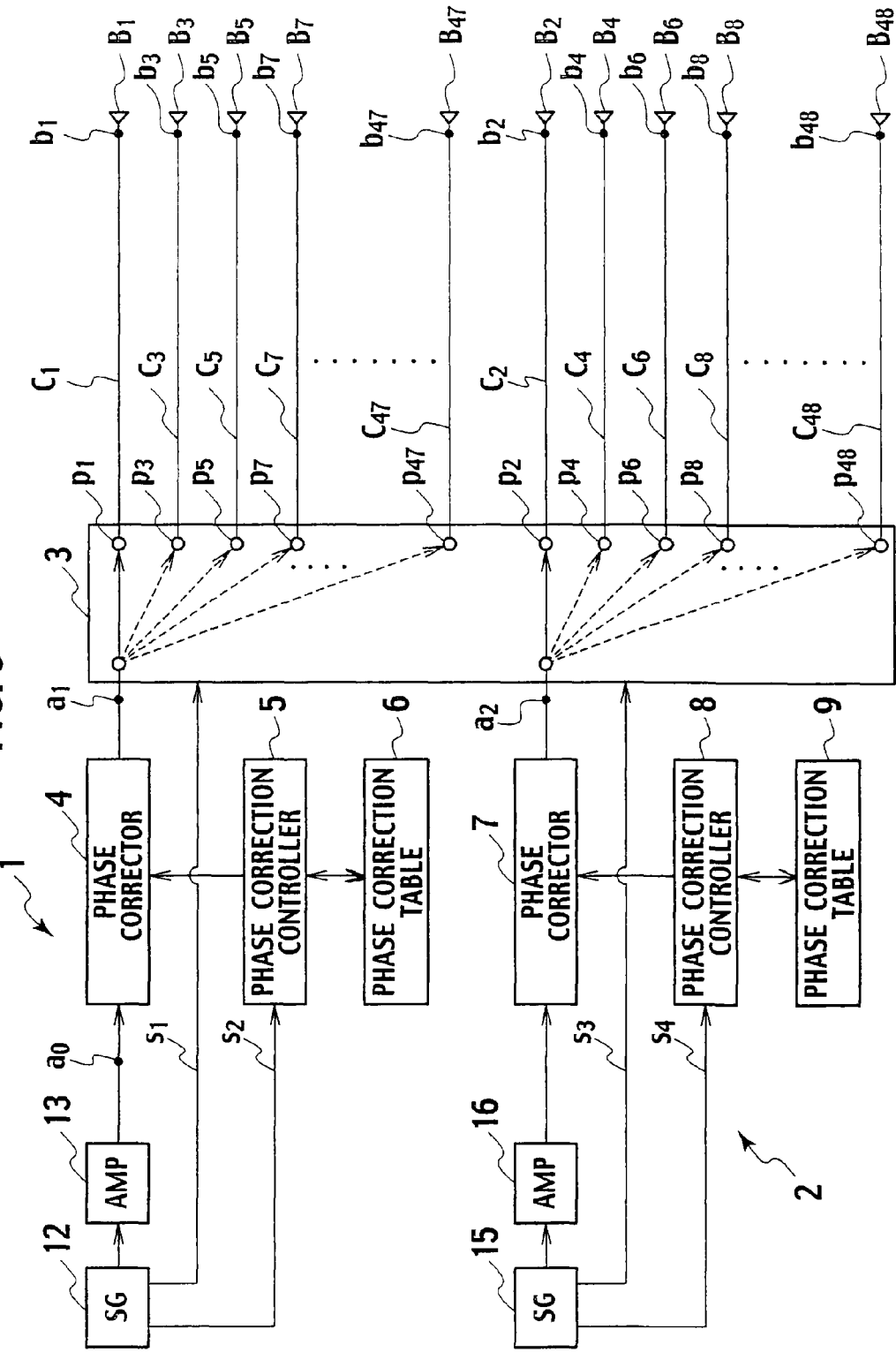
FIG. 3 is a view showing a sideband transmission system of a DVOR apparatus according to an embodiment.
Figure 5:
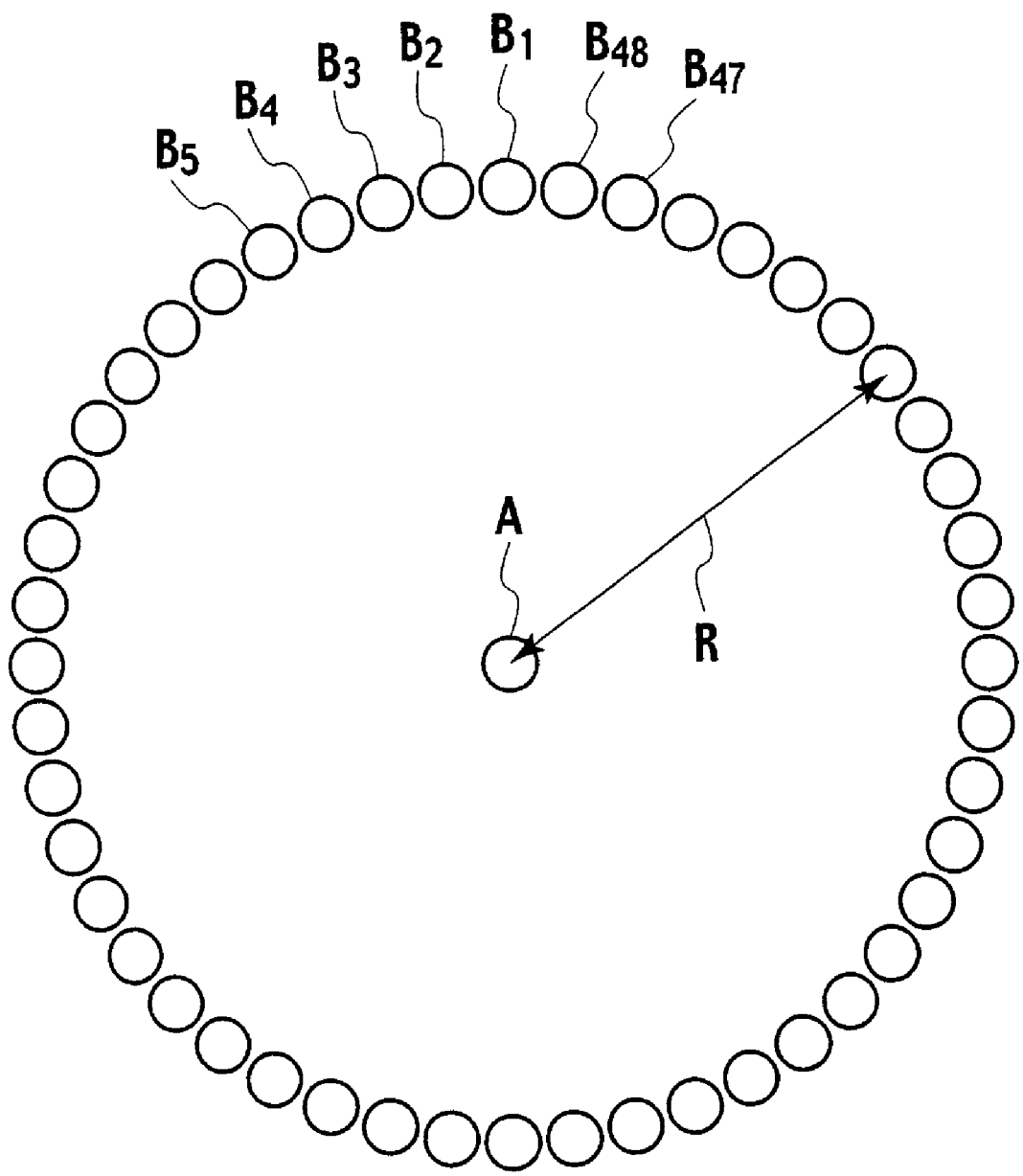
FIG. 5 is a top view showing an arrangement of a carrier antenna and sideband antennas in a DVOR apparatus.

FIG. 3 is a view showing a sideband transmission system of a DVOR apparatus according to an embodiment of the present invention. In FIG. 3, the same parts as those shown in FIG. 1 are represented with the same reference numerals and the detailed explanations thereof are omitted. The DVOR apparatus according to the embodiment of FIG. 3 arranges a carrier antenna A and forty-eight sideband antennas B1 to B48 in the same manner as that shown in FIG. 5. FIG. 3 shows only the sideband transmission system of the DVOR apparatus, and a carrier transmission system of the DVOR apparatus is not shown therein.

In FIG. 3, a sideband transmitter 1 has a signal generator (SG) 12, a power amplifier (AMP) 13, a phase corrector 4, a phase correction controller 5, and a phase correction table 6. In particular, a half-sine wave signal as a sideband signal is generated by the signal generator 12, amplified by the power amplifier 13, and supplied to the phase corrector 4. The switching of a distributor 3 is controlled by a switching control signal s1 outputted from the signal generator 12 so that the amplified half-sine wave signal is sequentially supplied to odd-numbered sideband antennas B1, B3, . . . , and B47. The signal generator 12 outputs a synchronization signal s2 to a phase correction controller 5 so that phase correction is carried out by the phase corrector 4 in synchronization with the switching of the distributor 3.

Based on an output from the phase correction controller 5 to be explained later, the phase corrector 4 corrects a phase of the half-sine wave signal generated by the signal generator 12 and amplified by the power amplifier 13 and outputs the phase-corrected half-sine wave signal to the distributor 3. In response to a switching control signal from the signal generator 12, the distributor 3 switches the sideband antennas from one to another so that the phase-corrected half-sine wave signal from the phase corrector 4 is supplied to a proper one of the sideband antennas.

In response to a synchronization signal s2 from the signal generator 12, the phase correction controller 5 refers to a phase correction table 6 and provides the phase corrector 4 with a phase correction control signal together with a phase correction value retrieved from the phase correction table 6.

The phase correction table 6 stores a phase correction value for each of the odd-numbered sideband antennas B1, B3, . . . , and B47, the phase correction values being necessary to secure consecutiveness of radio waveforms emitted from these odd-numbered sideband antennas. The phase correction values are calculated by measuring electrical lengths of signal paths (antenna cables C1, C3, . . . , and C47) from the signal generator 12 to the odd-numbered sideband antennas B1, B3, . . . , and B47 with the use of, for example, a network analyzer and by finding differences among the measured electrical lengths. To cope with the aging of the antenna cables C1, C3, . . . , and C47, the phase correction values may be updated by periodically measuring the electrical lengths of the signal paths.

The odd-numbered sideband antennas B1, B3, . . . , and B47 are connected through the antenna cables C1, C3, . . . , and C47, respectively, to the distributor 3 and sequentially emit radio waves based on the half-sine wave signal generated by the signal generator 12 and amplified by the power amplifier 13.

In the DVOR apparatus of FIG. 3, a sideband transmitter 2 has a signal generator (SG) 15, a power amplifier (AMP) 16, a phase corrector 7, a phase correction controller 8, and a phase correction table 9. A half-cosine wave signal is generated by the signal generator 15, amplified by the power amplifier 16, and supplied to the phase corrector 7. The signal generator 15 controls the switching of the distributor 3 so that the half-cosine wave signal is sequentially supplied to even-numbered sideband antennas B2, B4, . . . , and B48. The signal generator 15 outputs a synchronization signal s4 to a phase correction controller 8 so that phase correction is carried out by the phase corrector 7 in synchronization with the switching of the distributor 3.

The phase corrector 7 corrects a phase of the half-cosine wave signal generated by the signal generator 15 and amplified by the power amplifier 16 and sends the phase-corrected half-cosine wave signal to the distributor 3. In response to a switching control signal s3 from the signal generator 15, the distributor 3 switches the sideband antennas from one to another so that the phase-corrected half-cosine wave signal from the phase corrector 7 is supplied to a proper one of the sideband antennas.

In response to a synchronization signal s4 from the signal generator 15, the phase correction controller 8 refers to a phase correction table 9 and provides the phase corrector 7 with a phase correction control signal together with a phase correction value retrieved from the phase correction table 9.

The phase correction table 9 stores a phase correction value for each of the even-numbered sideband antennas B2, B4, . . . , and B48, the phase correction values being necessary to secure consecutiveness of radio waveforms emitted from these even-numbered sideband antennas. The phase correction values are calculated by measuring electrical lengths of signal paths (antenna cables C2, C4, . . . , and C48) from the signal generator 15 to the even-numbered sideband antennas B2, B4, . . . , and B48 and by finding differences among the measured electrical lengths. To cope with the aging of the antenna cables C2, C4, . . . , and C48, the phase correction values may be updated by periodically measuring the electrical lengths of the signal paths.

The even-numbered sideband antennas B2, B4, . . . , and B48 are connected through the antenna cables C2, C4, . . . , and C48, respectively, to the distributor 3 and sequentially emit radio waves based on the half-cosine wave signal generated by the signal generator 15 and amplified by the power amplifier 16.

Operation of the DVOR apparatus shown in FIG. 3 will be explained. Although the following explanation relates to the sideband transmitter 1 supplying a half-sine wave signal to the odd-numbered sideband antennas B1, B3, . . . , and B47, the explanation is similarly applicable to the sideband transmitter 2 supplying a half-cosine wave signal to the even-numbered sideband antennas B2, B4, . . . , and B48.

The sideband transmitter 1 controls the distributor 3 so that the sideband antennas are switched from one to another every $1/720$ seconds to receive a half-sine wave signal from the signal generator 12. Supplying a half-sine wave signal generated by the signal generator 12 to the sideband antenna B1 will be explained. The signal generator 12 sends the generated half-sine wave signal to the phase corrector 4 through the power amplifier 13. Also, the signal generator 12 provides the distributor 3 with a switching control signal s1 so that the distributor 3 may supply the half-sine wave signal to the sideband antenna B1. At the same time, the signal generator 12 provides the phase correction controller 5 with a synchronization signal s2.

In response to the synchronization signal s2 from the signal generator 12, the phase correction controller 5 refers to the phase correction table 6, retrieves a phase correction value corresponding to the sideband antenna B1 from the phase correction table 6, and provides the phase corrector 4 with a phase correction control signal together with the stored phase correction value. The phase corrector 4 uses the phase correction value corresponding to the sideband antenna B1 supplied from the phase correction controller 5, to correct the half-sine wave signal provided by the signal generator 12 and amplified by the power amplifier 13 and supplies the phase-corrected half-sine wave signal to the distributor 3.

The distributor 3 supplies the phase-corrected half-sine wave signal from the phase corrector 4 to the sideband antenna B1 through the antenna cable C1.

Thereafter, the signal generator 12 provides the distributor 3 with a switching control signal so that the half-sine wave signal is supplied to the next sideband antenna B3 and the other sideband antennas. The signal generator 12 provides a phase correction controller 5 with a synchronization signal s2 so that the phase correction of the selected sideband antenna is conducted in synchronization with the switching of the distributor 3. In this way, the odd-numbered sideband antennas B1, B3, . . . , and B47 sequentially receive the half-sine wave signal whose phase is corrected with the use of phase correction values corresponding to the odd-numbered sideband antennas, respectively.

Figure 4:
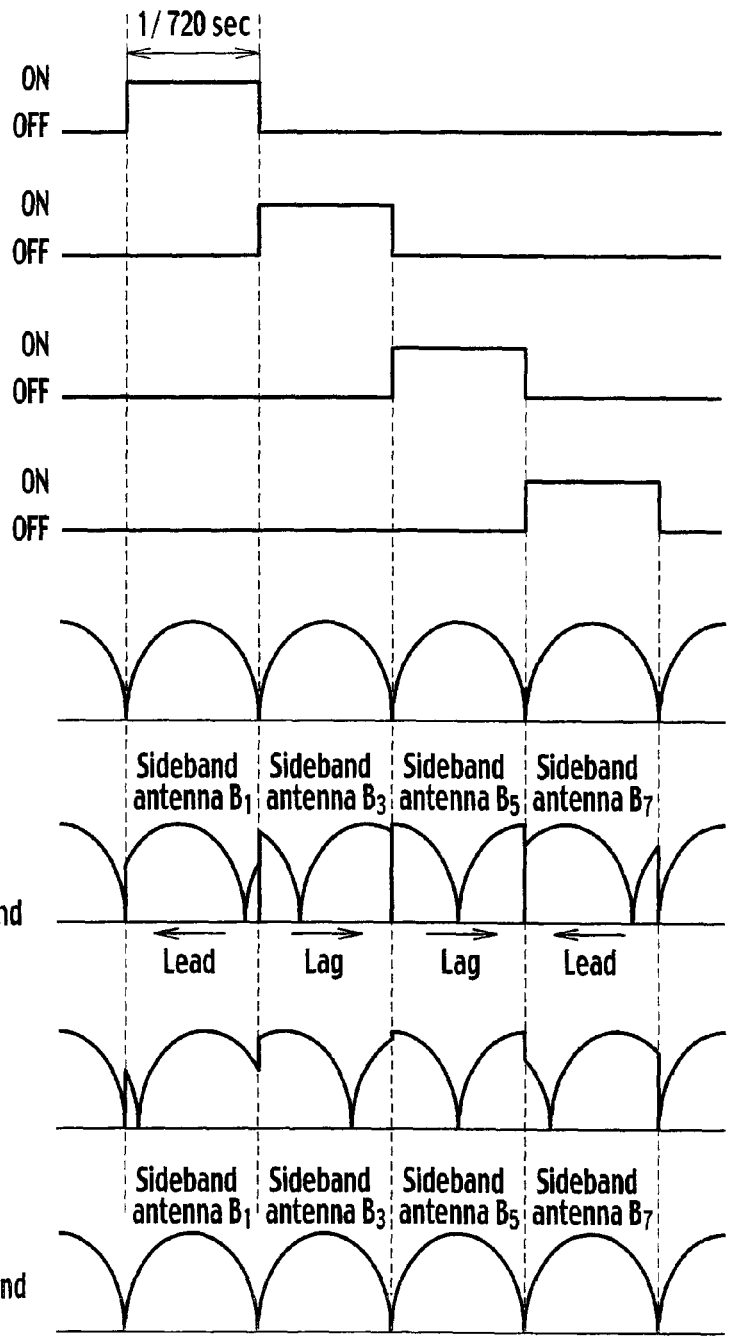
FIG. 4 is a view showing the timing of switching sideband antennas from one to another carried out by a distributor in the DVOR apparatus of FIG. 3 and waveforms of half-sine wave signals at input ends of the distributor and each sideband antenna.

FIG. 4 is a view showing the switching timing ((a)-(d)) of sideband antennas carried out by the distributor 3, and waveforms ((e)-(h)) of a half-sine wave signal at input end (a0 in FIG. 3) of the phase corrector 4, input ends of the distributor (a1 in FIG. 3) and sideband antennas (b1, b3, . . . , and b47). Waveforms of the half-sine wave signal at the input ends (b1, b3, . . . , and b47) of the sideband antennas B1, B3, . . . , and B47 are deformed as shown in (f) of FIG. 4 with respect to that at the input end (a0) of the phase corrector as shown in (e) of FIG. 4 due to variations in the electrical lengths of the antenna cables C1, C3, . . . , and C47 if no phase correction is conducted by the phase corrector 4. Thus, radio waveforms to be emitted from the sideband antennas B1, B3, . . . and B47 will be discontinuous.

On the contrary, in a case where phase correction is conducted by the phase corrector 4, waveforms of the half-sine wave signal at the input end (a1) of the distributor are corrected as shown in (g) of FIG. 4. Therefore, waveforms of the half-sine wave signal at the input end (b1, b3, . . . , and b47) are as shown in (h) of FIG. 4, and thereby, the continuity of the radio waveforms radiated from the sideband antennas B1, B3, . . . , and B47 can be maintained. In other words, the phase correction is performed so that the phase of the output waveform and the switching timing of the distributor 3 are synchronized with each other and thereby the continuity of radiated waveforms can be maintained.

In this way, according to the present embodiment, the electrical lengths of signal paths from the sideband transmitter 1 to the sideband antennas B1, B3, . . . , and B47 are measured, phase correction values for the sideband antennas are calculated, respectively, according to the measured electrical lengths, and the phase of a half-sine wave signal supplied from the sideband transmitter 1 to each sideband antenna is corrected according to the phase correction value for the sideband antenna. Consequently, without precisely equalizing the lengths of the antenna cables C1, C3, . . . , and C47, the consecutiveness of radio waveforms emitted from the sideband antennas can be secured according to the present embodiment. Furthermore, the continuity of output waveforms of radiation can be maintained even if all of the electrical lengths between each of input end a1 of the distributor 3 associated with each corresponding sideband antenna and the corresponding terminals p1, p3, . . . , and p47.

The electrical lengths of the signal paths may periodically be measured to update the phase correction values in the phase correction table 6 accordingly. This technique can easily handle, without hardware readjustment, phase shifts that may occur due to the aging of the antenna cables C1, C3, . . . , and C47.

Second Embodiment

Figure 6:
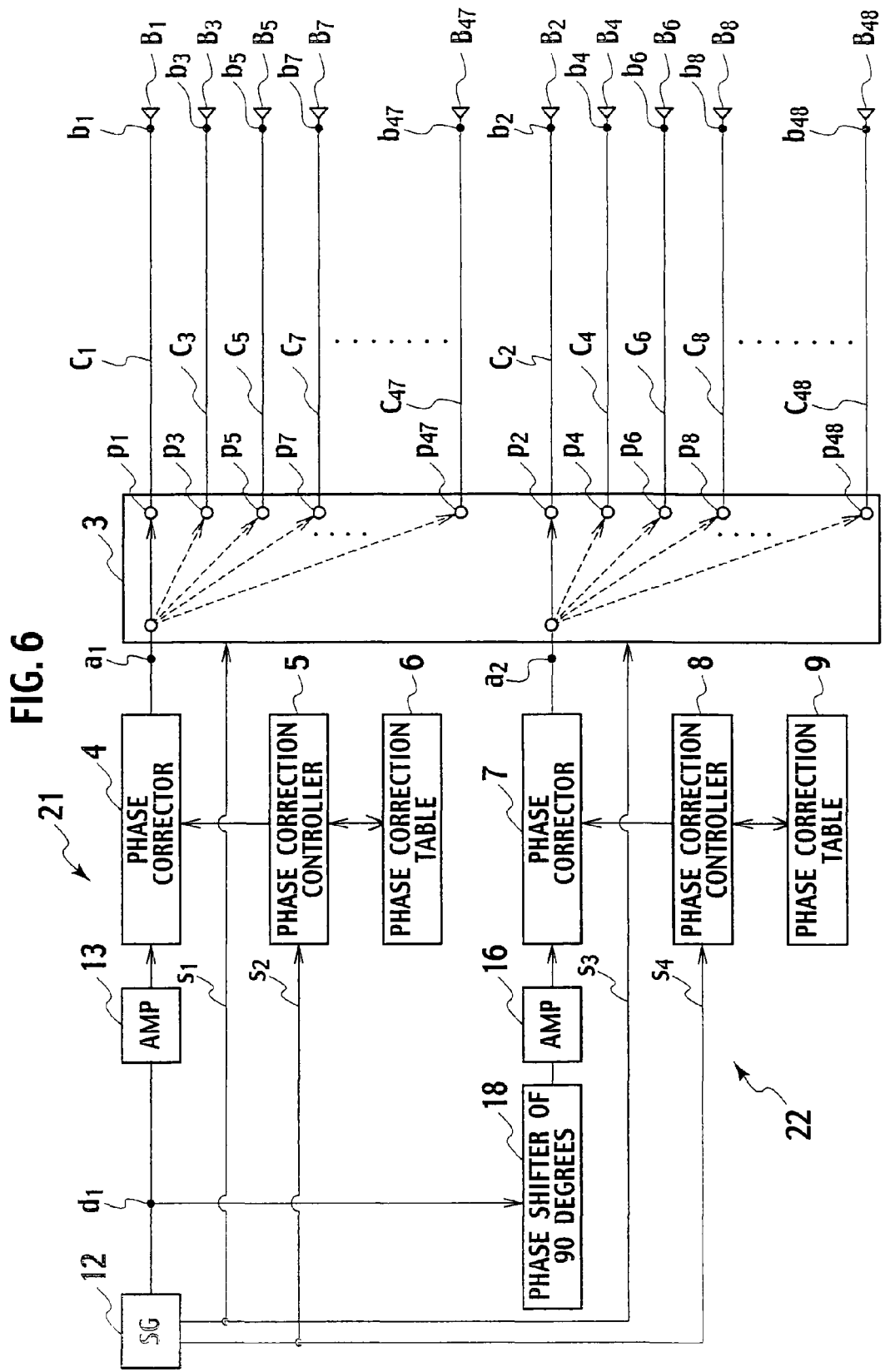
FIG. 6 is a view showing a DVOR apparatus according to a second embodiment.

Two signal generators 12 and 15 of the first embodiment may be integrally constituted. According to a second embodiment, as shown in FIG. 6, the half-sine wave signal outputted from the power amplifier 13 is divided at a dividing point d1, phase shifted by 90 degrees through the phase shifter 18, and inputted to the power amplifier 16 as the half-cosine wave signal. According to the second embodiment of the DVOR apparatus, two sideband transmitters are realized using only one signal generator 12.

Modifications

As shown in FIG. 3, the power amplifier (AMP) 13 of the DVOR apparatus of the first embodiment is connected to the output side of the signal generator 12. The power amplifier (AMP) can be also connected between the output end of the phase corrector 4 and the input end of the distributor 3, and therefore, a sideband transmitter 1' can be implemented as shown in FIG. 7.

Figure 8:
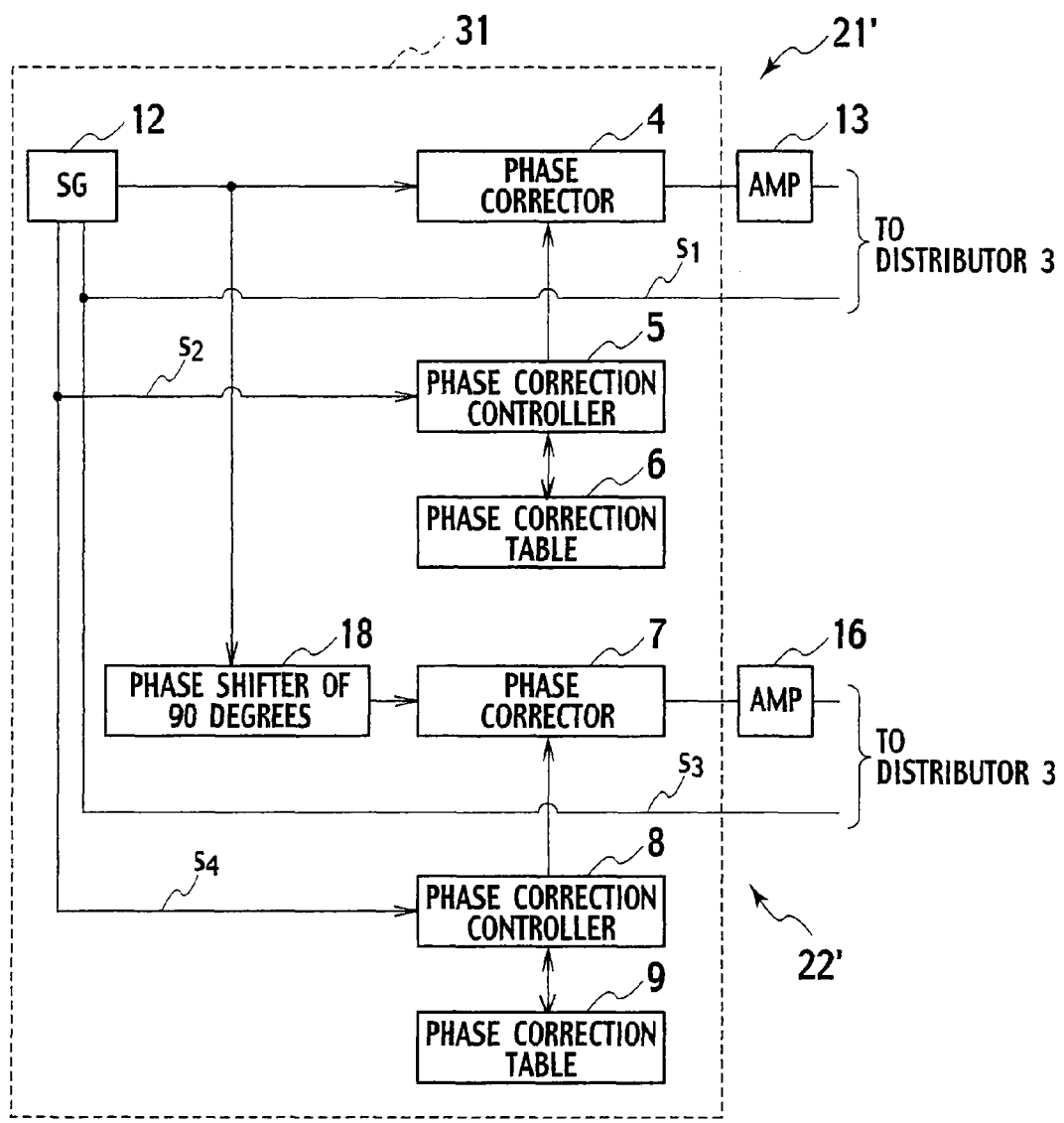
FIG. 8 is a view showing a modification of a sideband transmitter of the second embodiment.

In a similar manner, with regard to the DVOR apparatus of the second embodiment, the power amplifier (AMP) 13 (16) can be also connected between the output end of the phase corrector 4(7) and the input end of the distributor 3, and therefore, a sideband transmitter 21' (22') can be implemented as shown in FIG. 8.

Figure 7:
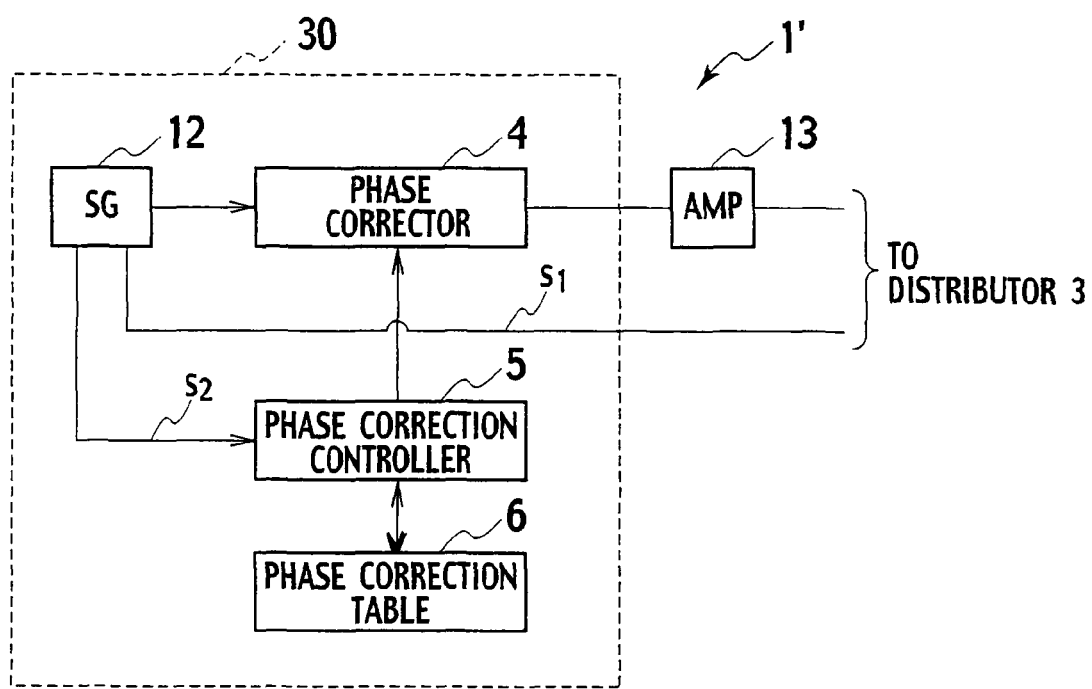
FIG. 7 is a view showing a modification of a sideband transmitter of the first embodiment.

As to the DVOR apparatus of the first embodiment, the signal generator 12(15), the phase corrector 4(7), the phase correction controller 5(8), and the phase correction table 6(9) can be integrated into one integration circuit as the signal generation part 30 shown in FIG. 7. That is, the phase correctors 4, 7 and the phase correction tables 6, 9 can be realized as inner functions of the signal generation part 30.

In a similar manner, with regard to the DVOR apparatus of the second embodiment, a signal generation part including the signal generator 12, the phase corrector 4, the phase correction controller 5, and the phase correction table 6, the signal generator 12, the phase shifter 18, the phase corrector 7, the phase correction controller 8, and the phase correction table 9 can be integrated into one integration circuit 31 as shown in FIG. 8.

INDUSTRIAL APPLICABILITY

The present invention is applicable to radar signal processors of radar systems.

This application claims benefit of priority under 35 U.S.C. 119 to Japanese Patent Application No. 2006-163355 filed on Jun. 13, 2006, the entire contents of which are incorporated by reference herein. Although the present invention has been described above by reference to certain embodiments of the present invention, the present invention is not limited to the embodiments described above. Modifications and variations of the embodiments described above will occur to those skilled in the art in light of the teachings. The scope of the present invention is defined with reference to the appended claims.

What is claimed is:

1. A phase correction apparatus, comprising:
a storing unit configured to store a phase correction value associated with each of a plurality of transmission antennas, the phase correction values being representative of an electrical length of an entire signal path from a signal generator that generates a transmission signal to each respective transmission antenna;
a switching unit configured to distribute the transmission signal between the transmission antennas; and
a correction unit configured to correct a phase of the transmission signal supplied from the signal generator through the switching unit to each transmission antenna in turn, according to the respective phase correction value for that transmission antenna stored in the storing unit, wherein
the switching unit is configured to connect the correction unit to each of the transmission antennas in turn.

2. A DVOR (Doppler VHF omnidirectional radio range) apparatus having a carrier antenna radiating a carrier signal and a plurality of sideband antennas arranged along a circle around the carrier antenna and sequentially emitting a sideband signal, the apparatus comprising:
a signal generator configured to generate a sideband signal;
a storing unit configured to store a phase correction value associated with each respective sideband antenna, each phase correction value being representative of an electrical length of an entire signal path extending from the signal generator to the respective sideband antenna;
a switching unit configured to distribute the transmission signal between the sideband antennas;
a correction unit configured to correct a phase of the sideband signal supplied from the signal generator through the switching unit to each sideband antenna in turn according to the respective phase correction value for the sideband antenna stored in the storing unit; and
a control unit configured to control the correction unit to correct the phase of the sideband signal in synchronization with the switching of the switching unit.

3. The DVOR apparatus of claim 2, wherein the phase correction values stored in the storing unit are updated according to changes in the electrical length of the signal path extending from the signal generator to the sideband antenna.

4. The DVOR apparatus of claim 2, further comprising a phase shifter configured to shift a phase of the sideband signal by 90 degrees and output the phase-shifted signal as the sideband signal.

5. The DVOR apparatus of claim 2, further comprising a power amplifier configured to amplify the sideband signal generated by the signal generator and output the amplified sideband signal to the correction unit.

6. The DVOR apparatus of claim 2, further comprising a power amplifier configured to amplify the phase corrected sideband signal and output the amplified sideband signal to the switching unit.

7. The DVOR apparatus of claim 2, wherein the signal generator, the storing unit, the control unit and the correction unit are integrated in an integration circuit.

8. The DVOR apparatus of claim 2, wherein the signal generator is further configured to generate a switching control signal and the switching unit is configured to switch between the sideband antennas in response to the switching control signal.

9. The DVOR apparatus of claim 2, wherein the signal generator is further configured to generate a synchronous signal provided to the control unit to synchronize with the switching of the switching unit.

10. A phase correction method in a phase correction apparatus for correcting a phase of a transmission signal that is generated by a signal generator and is sequentially supplied to a plurality of transmission antennas, the method comprising:
calculating and storing a phase correction value for each of the transmission antennas according to an electrical length of an entire signal path from the signal generator to the transmission antenna;
correcting the phase of the transmission signal supplied from the signal generator to each transmission antenna according to the respective phase correction value for that transmission antenna; and
switching a signal path of the corrected transmission signal to the corresponding transmission antenna.

11. The phase correction method of claim 10, further comprising correcting and updating each of the stored calculated phase correction values.

* * * * *